United States Patent

[11] 3,626,016

[72] Inventor Kenneth R. Martin
 Gastonia, N.C.
[21] Appl. No. 700,023
[22] Filed Jan. 24, 1968
[45] Patented Dec. 7, 1971
[73] Assignee Lithium Corporation of America
 New York, N.Y.

[54] ALKYNYLATION OF KETONES AND ALDEHYDES USING COMPLEXES HAVING UTILITY THEREFOR
13 Claims, No Drawings

[52] U.S. Cl...................................................... 260/638 Y,
 260/347.8, 260/397, 260/594, 260/607 R,
 260/617 E, 260/618 E, 260/631 R, 260/633,
 260/635 Y
[51] Int. Cl......................................................C07c 33/04,
 C07c 33/06, C07c 35/02
[50] Field of Search............................................ 260/635 Y,
 617 E, 631 R, 594, 618 E, 397, 633, 347.8

[56] References Cited
UNITED STATES PATENTS
2,777,884 1/1957 Rutledge et al............... 260/638 Y
3,028,423 4/1962 Blumenthal................... 260/638 Y OTHER REFERENCES
Kosolopuff, " Organephosphorus Compounds," 1950, pp. 32, 34, QD412P1K5

Primary Examiner—Howard T. Mars
Assistant Examiner—Joseph E. Evans
Attorney—Wallenstein, Spangenberg, Hattis & Strampel ABSTRACT: Ketones and aldehydes are alkynylated, particularly ethynylated, by reacting certain complexes of monoalkali metal alkynyls, such as monolithium acetylide-dimethylsulfoxide complex [(LiC CH)$_2$.CH$_3$—SO—CH$_3$], with a ketone or aldehyde. Novel complexes, such as the foregoing, are also disclosed including a method for the preparation thereof, as by reacting a dimethyl ether complex of methylsulfinylmethyllithium (LiCH$_2$—SO—CH$_3$.CH$_3$—O—CH$_3$) with acetylene.

ALKYNYLATION OF KETONES AND ALDEHYDES USING COMPLEXES HAVING UTILITY THEREFOR

My invention is directed to certain novel and highly useful methods of alkynylating carbonyl compounds of the class consisting of ketones and aldehydes, and it is also concerned with the production of certain novel and highly useful classes of chemical compounds, in the form of certain complexes, which are useful for the preparation of said alkynylated ketones and aldehydes. The invention has particular value for the ethynylation of methylvinyl ketone to produce intermediates which are of utility for the production of synthetic Vitamin A.

In present commercial practices for the production of synthetic Vitamin A, one of the important steps involved is the ethynylation of methylvinyl ketone. This is generally done by adding acetylene to a solution of metallic lithium in liquid ammonia and utilizing said solution to ethynylate methylvinyl ketone at low-temperature conditions, for example, $-35°$ C. and even lower. Yields of the desired ethynylated methylvinyl ketone are of the order of about 65 percent, based on the weight of metallic lithium utilized; and recoveries of the order of about 75 percent, based on the weight of methylvinyl ketone, are, generally speaking, obtained. Methylvinyl ketone is a rather costly compound and, therefore, it is important, from an economic standpoint, that the ethynylation reaction be so carried out that effective conversion occurs of the methylvinyl ketone to its ethynylation product and that high recoveries of said latter product be obtained.

In accordance with my present invention, yields of ethynylated methylvinyl ketone are obtainable of high magnitude, commonly well in excess of 90 percent, based upon the weight of the methylvinyl ketone, and very close to 100 percent, such as 96 percent or 97 percent. Such yields are obtained at low reaction temperatures, as described hereafter. Furthermore, high yields can also be obtained at relatively higher temperatures, for instance, at room temperature or of the order of about $25°$ C.

In the case of ethynylating methylvinyl ketone, this is especially advantageously accomplished, pursuant to the principles of my invention, by reacting a monolithium acetylide dimethylsulfoxide complex [(LiC≡CH)$_2$·CH$_3$—SO—CH$_3$] with said ketone to produce an ethynylation reaction product which, on hydrolysis, is converted to methylvinylethynyl carbinol

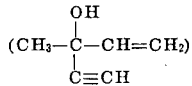

The monolithium acetylide-dimethylsulfoxide complex, which is a new compound and which is representative of a new class of compounds as further described hereafter, is advantageously made by reacting an ether complex of methylsulfinylmethyllithium, for example, a dimethyl ether complex, which latter complex may be represented by the formula (LiCH$_2$—SO—CH$_3$·CH$_3$—O—CH$_3$), with acetylene. This reaction, too, is novel and is representative of a type of reaction which will be disclosed in further detail below. The production of the aforesaid intermediate ether complexes of compounds such as methylsulfinylmethyllithium may be accomplished in a number of ways but I have evolved certain procedures for their preparation which are especially advantageous, particularly from the standpoint of economical considerations.

While I have referred above to what represent narrow, but highly important aspects of my invention, the invention has significant broader aspects as will be pointed out in detail below.

In broad terms, alkynylation of ketones and aldehydes is accomplished pursuant to my invention by reacting the ketone or aldehyde, as the case may be, with a dihydrocarbylsulfoxide complex of a monoalkali metal alkynyl. The monoalkali metal alkynyl, which is complexed with said dihydrocarbylsulfoxide, is initially produced in the form of a liquid Lewis base ether, phosphine or sulfide complex, particularly an ether complex, of the monoalkali metal hydrocarbylsulfinylhydrocarbyl, and said latter complex is then reacted with an acetylenic compound to produce the dihydrocarbylsulfoxide complex of the monoalkali metal alkynyl. Particularly useful, as indicated above, are those complexes, for reaction with ketones or aldehydes, where the dihydrocarbylsulfoxide is dimethylsulfoxide, and where the monoalkali metal alkynyl is monolithium acetylide. In the production of said particularly useful complexes, it follows that it is especially desirable to use methylsulfinyl methyllithium (LiCH$_2$—SO—CH$_3$) in the form of its ether complexes, especially where the ether is dimethyl ether, THF or dimethoxyethane, which is reacted with acetylene to produce the monolithium acetylide-dimethylsulfoxide complex.

The overall reaction scheme of my invention may be indicated as set out below, utilizing a dilithiohydrocarbon as the lithium source for the production of the monolithium alkynyl, dimethylsulfoxide as the dihydrocarbylsulfoxide, dimethyl ether as the ether complexing agent, acetylene as the acetylenic compound, and methylvinylketone as the carbonyl compound:

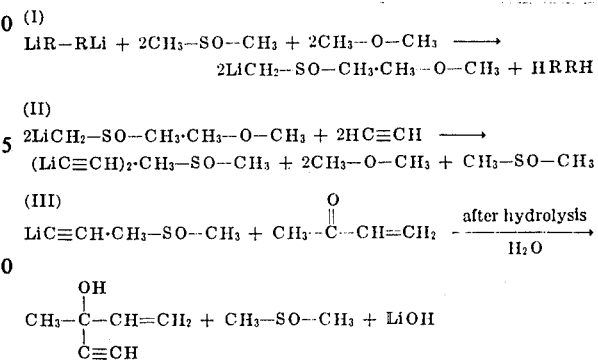

The method of my invention has a number of advantages over the aforementioned known liquid ammonia-lithium amide procedure in that:

(1) The reaction generally may be carried out much more rapidly, it is generally much cleaner, and little cooling is required;

(2) The yields of the product alkynols are generally greatly increased, in various cases being close to quantitative; and (3) Alkynylation of α, β-unsaturated aldehydes can be carried out by my method, which is impossible in liquid ammonia because of its Bronsted-basic nature.

The monoalkali metal hydrocarbylsulfinylhydrocarbyl complexes, such as the LiCH$_2$—SO—CH$_3$ complexes, have the distinct advantage over heretofore prepared uncomplexed compounds, such as LiCH$_2$—SO—CH$_3$ in that, in such previous procedures, DMSO has been used as the solvent. In accordance with my invention, the complexes can be isolated as relatively stable compounds and can be appropriately reacted in any selected inert medium which may be more suitable than DMSO.

It may here be noted that the production of monoalkali metal hydrocarbylsulfinylhydrocarbyls, including methylsulfinylmethyl lithium, and the corresponding sodium compounds, is known to the art and no novelty is claimed therein. Thus, for example, the reaction of sodium hydride with dimethylsulfoxide, and the reaction of n-butyllithium with dimethylsulfoxide in a tetrahydrofuran medium, to produce the monoalkali metal methylsulfinylmethyl compounds

, where Me is sodium and lithium, respectively, are described by E. J. Corey and Michael Chaykovsky, Journal of the American Chemical Society, Vol. 87, pp. 1345-1353 (1965); and said compounds, and others of like character, are disclosed in U.S. Pat. No. 3,288,860, and are there shown to be prepared, for instance, by reacting dimethylsulfoxide with alkali metals, alkali metal amides, alkali metal hydrides, alkali metal oxides or alkali metal alkyls, the reactions being carried out in nonreactive solvents or diluents such as aliphatic and aromatic hydrocarbons, ethers and amines such as diethyl ether, tetrahydrofuran, 1,2-dimethoxyethane, butylamine, ethylenediamine, pyridine and morpholine.

I have, however, found it to be especially advantageous to prepare the intermediate methylsulfinylmethyllithium-ether complexes by reacting a dihydrocarbylsulfoxide, for instance, dimethylsulfoxide, with a dilithio compound represented by the formula LiR—R—Li where R is a hydrocarbon radical, for instance, dilithiodiisoprene, in the presence of a Lewis base ether, sulfide or phosphine, particularly an ether, in an amount sufficient to complex the methylsulfinylmethyllithium which forms during the reaction. The advantage of using the dilithio compounds is that all of the lithium metal used in the preparation of the dilithio compound is present in the dilithio compound is used in the formation of the methylsulfinylmethyllithium, whereas this is not the case where alkyllithiums such as n-butyllithium are utilized, since one-half of the lithium initially present is lost in the preparation of the alkyllithiums. However, the complexed methylsulfinylmethyllithium intermediates can be prepared using lithium metal, lithium hydride, alkyllithiums, aryllithiums such as phenyllithium and heteroaryllithiums such as 2-thienyllithium.

Various of the dihydrocarbylsulfoxide complexes of the monoalkali metal alkynyls, exemplified by the dimethylsulfoxide complex of monolithium acetylide, are white powdery solids which decompose rapidly in air and water, often with the evolution of smoke. They are, generally, not shock-sensitive. The solid compounds are commonly only sparingly soluble in hydrocarbons, both aliphatic and aromatic, and in monoethers; they are somewhat more soluble in diethers such as dimethoxyethane and dioxane and are very soluble in DMSO. Their solubility characteristics make them easy to isolate by simple filtration in an inert atmosphere. Where the alkali metal is sodium instead of lithium, the complexes are commonly somewhat more stable than the lithium analog as, for instance, in the case of the dimethylsulfoxide complex of monosodium acetylide which complex, it may be noted, is a yellow crystalline material.

It is particularly advantageous to utilize as the medium in which the alkali metal metalation of the DMSO or other dihydrocarbylsulfoxide is carried out an ether or a nonbasic organic solvent, such as benzene containing a sufficient amount of the ether, or other Lewis base phosphine or sulfide, to complex the monoalkali metal methylsulfinylmethyl compound or the like. Thus, as shown in the following example 1, a mixture of 94 percent benzene and 6 percent dimethyl ether is used as a solvent for the dilithiodiisoprene, the dimethyl ether complexing with the methylsulfinylmethyllithium. It may be stated that the reaction medium should be unreactive with respect to the dihydrocarbylsulfoxide as well as with respect to the organolithium utilized.

While the dihydrocarbylsulfoxide complexes of the monoalkali metal alkynyls have been designated as such, when produced in a solution in the presence of a Lewis base ether, for instance, is it possible that said complexes may also include the ether as a part thereof. Hence, when reference in made to the foregoing complexes in solution in which a Lewis base ether is present, it will be understood that there is encompassed the possibility that the ether may be present as a part of the otherwise defined complex.

The dihydrocarbylsulfoxides which can be used in practice of my invention are represented by the formula R—SO—R¹ where R and R¹ may be the same or different and where, for instance, R may be alkyl (including cycloalkyl) containing from one to 12 carbon atoms, R1 is alkyl containing from one to 12 carbon atoms or aryl or aralkyl hydrocarbons containing from six to nine carbon atoms. Thus, R and R¹ can be methyl, ethyl, propyl, isopropyl, butyl, isobutyl, amyl, isoamyl, hexyl, cyclohexyl; or aryl or aralkyl hydrocarbon such as phenyl as in diphenyl sulfoxide, or benzyl as in dibenzylsulfoxide; or R can be alkyl and R¹ can be aryl as in methylphenylsulfoxide, or benzyl as in methylbenzylsulfoxide, or R can be lower alkyl ($C_1$ to $C_4$) and R¹ can be higher alkyl (C8 to $C_{12}$) as in methyldodecylsulfoxide, isopropyldecylsulfoxide, and the like; or R and R¹ may be part of a ring as in cyclic hydrocarbon sulfoxides such as tetramethylene sulfoxide. Very satisfactory are the normally liquid sulfoxides, particularly dimethylsulfoxide (DMSO).

Among the various liquid ethers which can be used for forming complexes with the hydrocarbylsulfinylhydrocarbyllithiums or similar compounds are, by way of example, alkyl ethers, diethers and polyethers and cyclic ethers, dialkyl ethers such as dimethyl ether, diethyl ether, di-n-propyl ether, diisopropyl ether, di-n-butyl ether and diisobutyl ether; dialkyl ethers of aliphatic polyhydric alcohols such as the dialkyl ethers of alkylene glycols such as dimethyl ether of ethylene glycol, diethyl ether of ethylene glycol, diisopropyl ether of ethylene glycol, diisopropyl ether of diethylene glycol; dimethyl-, diethyl-and diisopropyl ethers of propylene glycol; cyclic ethers such as tetrahydrofuran (THF), tetrahydropyran (THP), dioxane, and 7-oxa[2,2,1]-bicycloheptane (OBH); and liquid ethers which can be represented by the formula

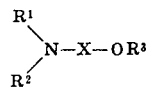

where R¹, R² and R³ are the same or different alkyl groups each containing from one to four carbon atoms, namely, methyl, ethyl, n-butyl, isobutyl, and tertiary-butyl; and X is a nonreactive group such as the lower alkylene groups

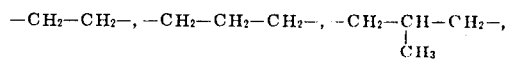

or other divalent hydrocarbon radicals, illustrative examples of such ethers being, for instance, 2-dimethylaminoethylmethyl ether [$(CH_3)_2N—CH_2—CH_2—O—CH_3$], 2-diethylaminoethylmethyl ether [$(C_2H_5)_2N—CH_2—CH_2—O—CH_3$]; and 2-dimethylaminopropylmethyl ether [$(CH_3)_2N—CH_2CH_2CH_2—O—CH_3$; and cycloaliphatic and aromatic ethers such as dicyclohexyl ether and dibenzyl ether. Especially satisfactory are THF and other ethers having solvating properties similar thereto as, for instance, dimethoxyethane.

Among the Lewis base phosphines and sulfides are, for instance, dimethylphosphine, trimethyl phosphine, triethyl phosphine, monophenyl phosphine, diphenyl phosphine, dimethyl-phenyl phosphine, dimethylsulfide, diethylsulfide, tetrahydrothiene and the like.

Other media in which the alkynylation reactions can be carried out are hexa-alkylphosphoramides, exemplified by hexamethyl-phosphoramide [$(CH_3)_2N]_3P$ O and hexaethylphosphoramide [$C_2H_5)N]_3P$ O, and normally liquid sulfoxides such as dimethylsulfoxide and tetramethylene sulfoxide.

The method of the present invention is applicable to the alkynylation and, especially, the ethynylation of ketones and aldehydes generally, of aliphatic (including cycloaliphatic) or aromatic character, saturated and unsaturated. As is evident below, these ketones and aldehydes include alkanones, alkenones, alkanals and alkenals. Illustrative of such ketones are acetone, methylethyl ketone, methyl n-propyl ketone, diethylketone, di-n-propyl ketone, diisopropyl ketone, di-n-butyl ketone, diisobutyl ketone, methyl-t-butyl ketone, di-n-amyl ketone, diisoamyl ketone, diacetyl, hexanone, cyclopentanone, cyclohexanone, isophorone, benzophenone, mesityl oxide, methylbenzyl ketone; 17-keto steroids, for instance, estrone which, on ethynylation, produces ethynylestradiol, and similar 17 -keto steroids which, on ethynylation, produce 17β-ethynyl steroids such as mestranol and analogous compounds; and ethyl β-chlorovinyl ketone which, on ethynylation, produces "Placidyl;" and illustrative of such aldehydes are formaldehyde, acetaldehyde, glyoxal, propionaldehyde, n-butyraldehyde, isobutyraldehyde, n-valeraldehyde, isovaleraldehyde, n-caproaldehyde, n-heptaldehyde, β-benzaldehyde, β-naphthaldehyde, glyceraldehyde, and aldehydes of other di- and polyhydric aliphatic alcohols. It may be noted that, depending upon the nature of the α, β-unsaturated ketones and aldehydes, the ethynylation reaction may produce 1,2!-or 1,4-addition, that is, the production of vinyl alkynols or 2-ethynyl aldehydes or ketones or their ethynylation products.

In connection with the ethynylation of aldehydes, it may be noted that it has heretofore been known that saturated aldehydes can be ethynylated to produce ethynylation reaction products in quite high yields using monosodium acetylide in a suitable solvent. However, when α, β-unsaturated aldehydes are similarly ethynylated, poor yields are the general rule, just as is the situation with unsaturated ketones [Hennion and Lieb, J. Am. Chem. Soc. 66, 1289 (1944)]. As illustrative of the difficulties of ethynylating acrolein, reference is made to U.S. Pat. No. 2,879,308 where the method involves protecting the vinyl group of the acrolein against polymerization by reversibly forming a Diels-Alder adduct with a diene, such as cyclopentadiene, and then ethynylating said adduct with monosodium acetylide, the method taking 16 hours, involving heating the product to 370°–400° F. to reverse the adduct formation, and producing only a 31 percent yield of the alkynol.

In accordance with the present invention, by way of illustration, acrolein has been ethynylated directly to produce a yield of the order of 69 percent (vinylethynyl carbinol) by a procedure taking only about 3 hours and at temperatures in the general range of −45° to −20° C. Good yields are also obtained, for instance, in the ethynylation of crotonaldehyde, benzaldehyde, and trans-cinnamaldehyde, and other unsaturated aldehydes, as well as unsaturated ketones, by quite simple procedures and in short reaction times in contrast to what has been pointed out above in regard to the ethynylation of acrolein.

While the invention is especially valuable in carrying out ethynylation reactions with ketones and aldehydes, it is useful also in carrying out alkynylation reactions in general with ketones and aldehydes, as well as arylalkynylations and aralkynylations of ketones and aldehydes. Thus, for example, in the case of propynylations, propyne ($CH_3-C\equiv CH$) is utilized in place of acetylene; and, in the case of propargylations, propargyl alcohol ($HC\equiv C-CH_2OH$) is used in place of acetylene. Other illustrative acetylenic compounds, including acetylenic hydrocarbons and acetylenic alcohols, which can be used are ethylacetylene, pentyne-1, hexyne-1, phenylacetylene, and benzylacetylene. For convenience of expression in the claims, the term "alkynylation" is used generically to encompass ethynylation and other alkynylations using alkynes as well as arylalkynylations and aralkynylations.

The following examples are illustrative of the practice of the invention, but they are not to be construed as in any way limitative thereof since various changes can readily be made in the light of the guiding principles and teachings disclosed herein. All temperatures recited are in degrees Centigrade.

EXAMPLE 1

Preparation of Methylsulfinylmethyllithium Dimethyl Ether Complex

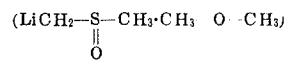

50 ml. of a solution of dilithiodiisoprene in benzene-dimethyl ether (94 percent benzene −6 percent dimethyl ether), containing 0.05 equivalents of lithium, prepared, for instance, as described in the copending application of Conrad W. Kamienski et at, Ser. No. 334,013, filed Dec. 27, 1963, and now U.S. Pat. 3,388,178, was placed in a 100 ml. −3 neck flask, in a nitrogen atmosphere, equipped with a magnetic stirrer, a water-covered condenser, a pressure-equalizing dropping funnel and a thermometer. An ice bath was placed around the flask and, after the solution had cooled to 10°, neat dimethylsulfoxide (3.9 g., 0.05 mol) was added dropwise at such a rate that the temperature did not exceed 20°. When the addition was complete, the milky-white suspension of methylsulfinylmethyllithium dimethyl etherate was filtered through a pressure funnel with a fritted glass disc. The solid was washed twice with pentane and blown dry with dry nitrogen, giving 5.6 g. (85 percent) of a white powder, methylsulfinylmethyllithium dimethyl ether complex, with a neutralization equivalent of 132 (calculated 130) and a decomposition temperature (sealed tube) of 71°.

Additional illustrative Lewis base ether complexes of monoalkali metal hydrocarbylsulfinylhydrocarbyls which have been made following the same procedure generally as is described in example 1 are set out below in table I.

TABLE I

| Metal | Ether | Complex | Neutralization equivalent | | Decomposition temperature ° C. |
|---|---|---|---|---|---|
| | | | Calculated | Found | |
| Li | THF | $LiCH_2-SO-CH_3 \cdot THF$ | 156 | 157 | 70 |
| Li | (Dimethyl ether) DME. | $LiCH_2-SO-CH_3 \cdot DME$ | 130 | 132 | 71 |
| Li | (Dimethoxyethane) DMeE. | $(LiCH_2-SO-CH_3)_4 \cdot DMeE$ | 117 | 117 | 122 |
| Na | THF | $NaCH_2-SO-CH_3 \cdot THF$ | 172 | 168 | 103 |
| Na | DMeE | $(NaCH_2-SO-CH_3)_4 \cdot DMeE$ | 122.5 | 120 | 127 |

EXAMPLE 2

Preparation of Methylsulfinylmethylsodium Tetrahydrofuran Complex ($NaCH_2SOCH_3 \cdot C_4H_8O$)

In an inert atmosphere, such as nitrogen, sodium hydride (9.6 g. of a 50 percent dispersion in mineral oil; 0.20 mol) was added to 50 ml. of tetrahydrofuran and stirred for 10 minutes to dissolve the oil. Then dimethyl sulfoxide (15.6 g. 0.20 mol) was added rapidly. Evolution of hydrogen began at once with mild heating. The reaction mixture was then heated to reflux (65°) and refluxed until the evolution of hydrogen ceased (4 –5 hours). The yellow-gray slurry was filtered through a fritted glass disc, washed twice with pentane and dried with a stream of nitrogen. The resultant white powder, methylsulfinylmethylsodium tetrahydrofuran, (31.0 g., 88 percent yield), had a neutralization equivalent of 168 (calculated for $NaCH_2SOCH_3 \cdot C_4H_8O$, 172), and a decomposition temperature of 127°.

EXAMPLE 3

Preparation of Monolithium Acetylide Dimethylsulfoxide Complex

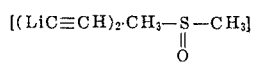

A sample of solid methylsulfinylmethyllithium dimethyl ether complex, prepared as described in example 1, was placed in a 100 ml. flask with gas inlet and outlet connections.

All systems were in an inert atmosphere of dry nitrogen. Acetylene gas was passed over the solid. A small amount of heat was evolved and the solid became yellow; in addition, a liquid was released which partially dissolved the solid. The entire mixture was washed with a 50/50 benzene/pentane mixture, the solid collected on a fritted glass disc and dried in a stream of nitrogen. The neutralization equivalent corresponded to the formula (LiC CH)$_2$·CH$_3$SOCH$_3$ (Calculated: 71, Found, 69.74). A sample of the solid dissolved entirely in dimethyl sulfoxide and tetrahydrofuran, showing that no dilithium acetylide was present in the monolithium acetylide·dimethyl sulfoxide complex.

EXAMPLE 4

Ethynylation of Methylvinyl Ketone

Dimethylsulfoxide (2.0 g., 0.025 mol) was dissolved in 100 ml. of tetrahydrofuran under a nitrogen atmosphere and 25 ml. of dilithiodiisoprene (approx. 1.0 normal in 94 percent benzene/6 percent dimethyl ether) was added dropwise but rapidly. After the first few drops, a white precipitate formed and increased steadily throughout the reaction. Some heat was evolved. Then acetylene was bubbled through the slurry by means of a tube extending below the surface of the liquid. The flow rate was 144 ml./minute. In 10-15 minutes, the precipitate had almost completely dissolved, giving a hazy yellow solution. The reaction mixture was then cooled to −35° by means of an external dry ice-acetone bath and neat methylvinyl ketone (1.75 g., 0.025 mol) was added dropwise over a 15-minute period. A pale green color developed almost at once and the haziness in the solution disappeared. The reaction mixture then was held at −35° for 3 hours with steady addition of acetylene after the ketone was added. The green color changed to clear yellow in 1.5-2 hours. At the end of the reaction period, the reaction mixture was hydrolyzed over a mixture of ice and one equivalent (1.7 g.) of acetic acid. Solid NaCl was added to the aqueous layer and the mixture was extracted twice with ether. The ether solution was dried over anhydrous Na$_2$SO$_4$, filtered and weighed. A weighed aliquot of about 500 mg. was removed and reacted with alcoholic silver nitrate. The released HNO$_3$ was titrated with 0.1N NaOH to the methylene blue endpoint, giving a calculated yield of methylvinylethynyl carbinol of 2.16 g. (96 percent).

EXAMPLE 5

Ethynylation of Acrolein

Lithium acetylide·dimethylsulfoxide complex (0.025 mols), prepared in tetrahydrofuran solution as described in Example 4, was cooled to −40° to −45° and, with continuous passage of acetylene, neat acrolein (1.4 g., 0.025 mol) was added dropwise. A blue-green color developed almost at once, and some insoluble material was formed. After the addition was completed, the reaction mixture warmed to −25° and stirred for 2 to 3 hours at this temperature. The reaction mixture was then decomposed over a mixture of ice and 1.7 g. (0.025 mol) of acetic acid. Sodium chloride was added to the mixture and it was extracted with ether. The ether extract was washed with saturated sodium bicarbonate and dried over anhydrous sodium sulfate. The filtered ether solution was weighed, and an aliquot of about 0.040 g. was reacted with alcoholic silver nitrate. The released acid was titrated with 0.1N NaOH to a methylene blue endpoint, giving 1.42 g. (69 percent yield) of pent-1-ene-4-yn-3-o 1

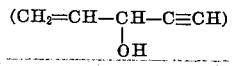

Other examples have been carried out in accordance with my invention as shown in table II.

TABLE II

| Ketone | Temp. °C. | Solvent | Time | Conc. m/l. | Yield % |
|---|---|---|---|---|---|
| Methylvinyl | −50 | THF | 3 hr. | 0.25 | 78 |
| Methylvinyl | −35 | THF | 3 hr. | 0.25 | 97 |
| Methylvinyl | +25 | THF | 15 min. | 0.25 | 88 |
| Methylvinyl | +25 | THF | 15 min. | 0.50 | 83 |
| Methylvinyl | +25 | Et$_2$O | 15 min. | 0.25 | 71* |
| Methylvinyl | +25 | THF | 15 min. | 0.50 | 84* |
| β-ionone | −35 | THF | 2 hr. | 0.25 | 100 |
| Cyclopentanone | +25 | THF | 1 hr. | 0.50 | 78 |
| Cyclopentanone | +35–8 | THF | 1 hr. | 0.50 | 90 |

*Preformed LiCH$_3$-SO-CH$_3$·THF was used

While it is particularly advantageous, generally speaking, that the alkali metal in the monoalkali metal alkynyls be lithium or, in certain cases, sodium, it will be understood that other alkali metals can be utilized as, for instance potassium, rubidium and cesium. In this connection, it may be noted that monosodium acetylide is a quite stable compound and that, from such standpoint, the enhancement of the stability thereof by means of dimethylsulfoxide or other dihydrocarbylsulfoxides in itself does not provide any commercial advantage. However, particularly where ethynylation unsaturated ketones and unsaturated aldehydes is involved, the dimethylsulfoxide and similar dihydrocarbylsulfoxide complexes of monosodium acetylide are much more satisfactory ethynylation agents than the uncomplexed monosodium acetylide or monosodium acetylide in liquid ammonia.

It will be understood, of course, that not all of the dihydrocarbylsulfoxide complexes of the monoalkali metal alkynyls will give the same or substantially equivalent results with all ketones or all aldehydes so far as percent yield or conversion to the respective alkynols are concerned. It will also be understood that, in general, concentrations of reactants plays a role in the yields obtained, and the same is true of reaction times and reaction temperatures. Low temperatures generally require longer reaction times. High temperatures tend to cause undesirable side reactions to occur. For optimum yields in any given case, these factors can readily be determined in the light of the teachings contained herein. In this connection, it may be noted that, particularly when working with relatively large quantities of reactants, especially in the ehtynylation of acrolein or similar α,β-unsaturated aldehydes, to produce vinylethynyl carbinol, the reaction from the hydrolysis to the first distillation should be carried out in as short a time as possible to avoid polymer formation since the latter occurs fairly rapidly in the impure reaction mixture. The purified distillate, however, can be stored prior to fractionation. Furthermore, the hydrolysis mixture should not be allowed to become basic but it should be either acid or neutral.

Such ethynylation reaction products of the present invention as, for example, methylvinylethynyl carbinol, as stated above, are useful as intermediates in the production of Vitamin A and Vitamin A-like products, and they are also of utility for the production of other pharmaceuticals by procedures which are well known to the art. The ethynylation reaction products made in accordance with this invention are also effective as brightening agents in electroplating baths for the electroplating of nickel, being used in the manner described, for instance, in U.S. Pat. No. 2,712,522, being water-soluble acetylenic alcohols.

I claim:
1. A method for preparing alcohols which comprises reacting (a) an acetylenic compound selected from the group consisting of alkynes, phenylacetylene, benzylacetylene and propargyl alcohol with (b) a liquid Lewis base complex of a monoalkali metal hydrocarbyl-sulfinylhydrocarbyl, said Lewis base being selected from the group consisting of dialkylethers, dialkyl ethers of alkylene glycols, THF, THP, dioxane, OBH; ethers represented by the formula

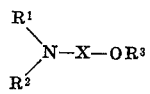

where $R^1$, $R^2$, and $R^3$ are the same or different alkyl groups each containing from 1 to 4 carbon atoms and X is lower alkylene: dicyclohexyl ether and dibenzyl ether; dimethylphosphine, trimethylphosphine, triethylphosphine, monophenyl phosphine, diphenyl phosphine, dimethylphenyl phosphine, dimethylsulfide, diethylsulfide and tetrahydrothiene, whereby to produce a complex of a monoalkali metal alkynyl dihydrocarbylsulfoxide, (c) then reacting said last-mentioned complex with a carbonyl compound selected from the group consisting of alkanones, alkenones, alkanals, alkenals, diacetyl, cyclopentanone, cyclohexanone, isophorone, benzophenone, methylbenzyl ketone, estrone, ethyl β-chlorovinyl ketone, furfural, benzaldehyde, β-naphthaldehyde and glyceraldehyde; and then hydrolyzing said reaction mixture.

2. The method of claim 1, in which the acetylenic compound is acetylene.

3. The method of claim 2, in which the monoalkali metal hydrocarbylsulfinylhydrocarbyl is $MeCH_2-SO-CH_3$ where Me is an alkali metal.

4. The method of claim 3, in which the Lewis base ether is selected from the group consisting of dimethyl ether and THF.

5. The method of claim 4, in which Me is lithium.

6. The method of claim 5, in which the carbonyl compound is methylvinyl ketone.

7. The method of claim 5, in which the carbonyl compound is an α,β-unsaturated aldehyde.

8. The method of claim 7, in which the carbonyl compound is acrolein.

9. A method for preparing alcohols which comprises reacting (a) a compound corresponding to the formula LiR-RLi where R is a hydrocarbon radical, with (b) dimethylsulfoxide, in the presence of (c) a liquid Lewis base ether whereby to produce a methylsulfinylmethyllithium ether complex, said Lewis base being selected from the groups consisting of dialkylethers, dialkyl ethers of alkylene glycols, THF, THP, dioxane, OBH; ethers represented by the formula

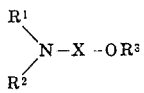

where $R^1$, $R^2$, and $R^3$ are the same or different alkyl groups each containing from 1 to 4 carbon atoms and X is lower alkylene; dicyclohexyl ether and dibenzyl ether; dimethylphosphine, trimethylphosphine, triethylphosphine, monophenyl phosphine, diphenyl phosphine, dimethylphenyl phosphine, dimethylsulfide, diethylsulfide and tetrahydrothiene, (d) then reacting said latter complex with acetylene to convert said latter complex to a monolithium acetylide-dimethylsulfoxide complex, (e) then reacting said monolithium acetylide-dimethylsulfoxide with a carbonyl compound selected from the group consisting of alkanones, alkenones, alkanals, alkenals, diacetyl, cyclopentanone, cyclohexanone, isophorone, benzophenone, methylbenzyl ketone, estrone; ethyl β-chlorovinyl ketone, furfural, benzaldehyde, β-naphthaldehyde and glyceraldehyde, to ethynylate the same and then hydrolyzing said reaction mixture.

10. A method according to claim 9, in which the carbonyl compound is unsaturated.

11. A method according to claim 10, in which the carbonyl compound is methylvinyl ketone.

12. A method according to claim 10, in which the carbonyl compound is acrolein.

13. A method according to claim 9, in which the LiR—(R-Li)$_n$ compound is selected from the group consisting of dilithiodiisoprene and dilithiodibutadiene, and the Lewis base ether is selected from the group consisting of dimethyl ether and THF.

* * * * *